S. B. HASELTINE.
FRICTION SHOCK ABSORBING MECHANISM.
APPLICATION FILED MAY 26, 1920.
1,398,692.
Patented Nov. 29, 1921.
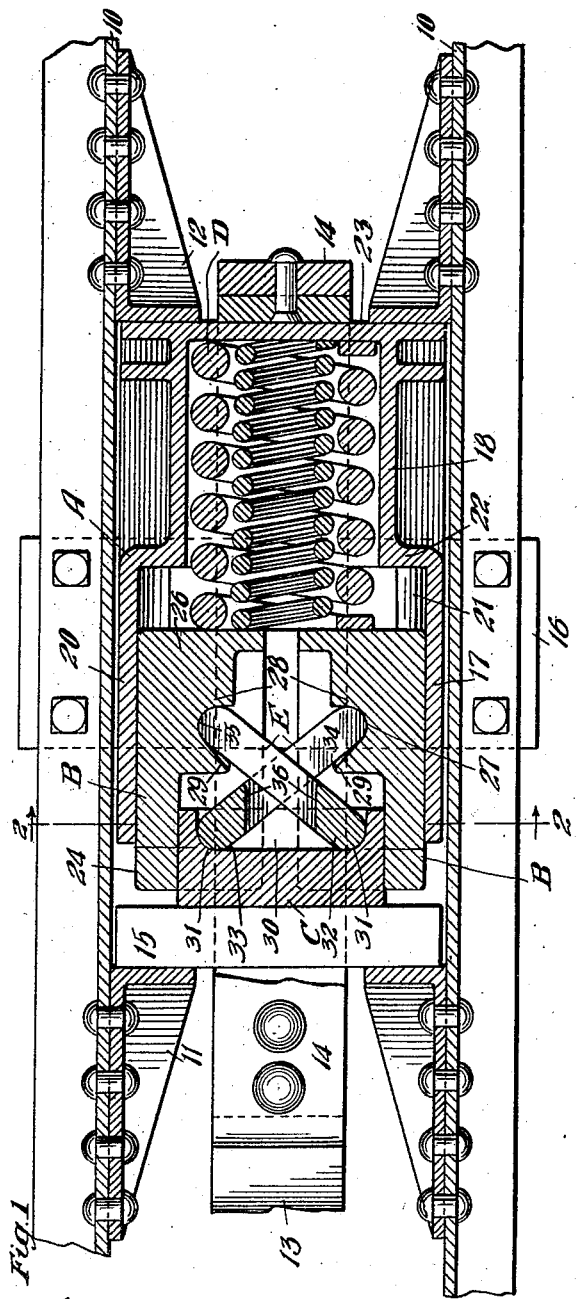
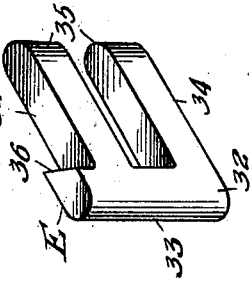
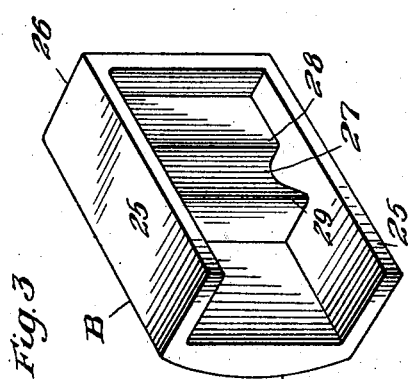
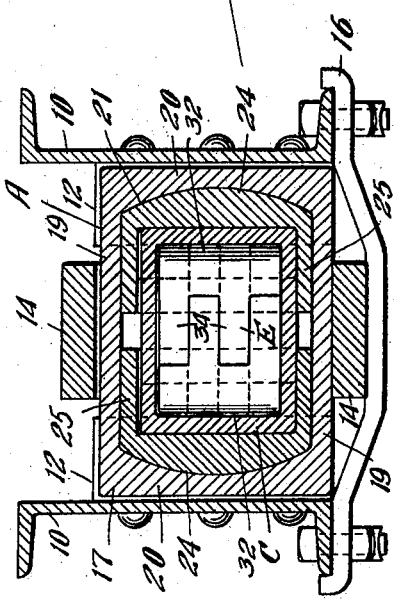
Witnesses
Wm. Geiger
Una C. Grigsby
Inventor
Stacy B. Haseltine
By Geo. I. Haight
His Atty.

UNITED STATES PATENT OFFICE.

STACY B. HASELTINE, CHICAGO, ILLINOIS, ASSIGNOR TO WILLIAM H. MINER, OF CHAZY, NEW YORK.

FRICTION SHOCK-ABSORBING MECHANISM.

1,398,692. Specification of Letters Patent. Patented Nov. 29, 1921.

Application filed May 26, 1920. Serial No. 384,324.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for use in railway draft riggings and wherein are employed toggle members for effecting the spreading or wedging action of the shoes against a friction shell, the toggle members being so arranged as to produce a proportionately greater spreading pressure on the shoes for a given blow than toggle arrangements heretofore employed.

Another object of the invention is to provide a friction shock absorbing mechanism employing toggle elements wherein the toggle elements are so arranged that a given movement thereof with respect to the friction shoes against which they bear will produce a greater spreading or wedging effect than heretofore obtained in friction mechanisms employing toggle elements and, conversely, will provide for a more effective and certain release.

The invention furthermore consists in the improvements in the parts and devices and in the novel combinations of the parts and devices herein shown, described and made the subject matter of claim.

In the drawing forming a part of this specification, Figure 1 is a longitudinal horizontal sectional view of a portion of a railway draft rigging showing my improvements in connection therewith. Fig. 2 is a vertical transverse sectional view taken substantially on the line 2—2 of Fig. 1. And Figs. 3 and 4 are detail perspectives of one of the friction shoes and one of the toggle elements, respectively.

In said drawing, 10—10 denote channel shaped center or draft sills of a railway car to the inner faces of which are secured front stop lugs 11 and rear stop lugs 12. A portion of a drawbar is indicated at 13 to which is rigidly attached a yoke 14 of well known form. The shock absorbing mechanism proper, hereinafter described, is mounted within the yoke as is also a front follower 15. The parts are adapted to be supported in operative position by a detachable saddle plate 16.

The friction shock absorbing mechanism proper, as shown, comprises, broadly, a combined friction shell and spring cage A; a pair of friction shoes B—B; a pressure-transmitting or transferring member or block C; a spring resistance D; and a pair of toggle elements E—E.

The combined friction shell and spring cage A is shown as having the friction shell 17 thereof at the forward end and the spring cage 18 at the rear end. The shell 17 is of substantially rectangular cross section as shown in Fig. 2 and has upper and lower walls 19—19 and side walls 20—20. The inner faces of the side walls 20 are outwardly curved as indicated at 21 to provide longitudinally extending friction surfaces. Rearwardly of the shell 17, the spring cage 18 proper is of reduced cross section and preferably of cylindrical form, thereby forming shoulders 22—22 at the inner end of the shell 17. The casting A is formed with the integral rear wall 23 adapted to act as the rear follower of the mechanism.

The friction shoes B—B, two in number, are of like construction and each is formed on its outer side with a convex friction surface 24 adapted to coöperate with the corresponding friction surface 21 of the shell. Each shoe B is further provided with upper and lower horizontally extending flanges 25—25, the same sliding between the upper and lower walls 19 of the shell. Near its rear end, each shoe B is made thicker or heavier as indicated at 26 so as to form a substantial bearing for the forward end of the spring D. The thickened part of each shoe B is also provided, on its inner side, with a vertically extending curved groove or recess 27 which acts as a bearing for one of the toggle elements E. It is obvious that a shoulder 28 will be formed in each shoe adjacent the bearing seat 27 and thus prevent bodily longitudinal movement of the toggle elements with respect to the shoes. Opposing shoulders 29 are also formed and in such a manner as to provide flaring openings for the seats 27.

The block or pressure-transmitting member C is of substantially rectangular outline and bears at its outer end against the follower 15, it being noted that the block extends beyond the outer ends of the shoes B so that no direct pressure is transmitted from the follower 15 to the shoes B. On its inner side, the block C is hollowed out or cupped as indicated at 30 to accommodate the outer ends of the toggle elements E, the opposite sides of the recess 30 being curved as indicated at 31—31 to form bearing seats for the corresponding ends of the toggle elements E.

The toggle elements E are preferably of like construction and each is formed at its outer end with a vertically extending section 32 rounded on its outer face as indicated at 33. Extending from the section 32 is a pair of vertically spaced legs 34—34 each of which has a rounded free end as indicated at 35—35. The spacing of the legs 34 is made such that the two toggle elements E may be crossed or intercalated as clearly indicated in Fig. 1. Beveled faces 36 are formed on the inner sides of the vertical sections 32 in order to provide ample clearance for the legs of the elements when assembled.

In the construction shown and described, it will be noted that each toggle has a bearing at one end on a friction shoe at one side of the central axis of the mechanism and a bearing at its other end against the block C on the opposite side of the said axis. With this arrangement, I am enabled to use elongated and relatively heavy toggle elements and dispose them at as blunt an angle as desired with respect to the axis of the mechanism and without thereby sacrificing any strength in the shoes or pressure block C.

As will be apparent to those skilled in the art, the nearer the toggle elements are to a position perpendicular to the axis of the mechanism, the greater will be the spreading or wedging effect on the shoes for any predetermined amount of movement of the outer ends of the toggle elements inwardly or longitudinally with respect to the shoes. Stated in another manner, the effective spreading component of the blow transmitted to the mechanism, i. e., the component which extends perpendicular to the sides of the friction shell, is increased as the toggle elements approach a position perpendicular to the sides of the shell. Any longitudinal movement of the outer ends of the toggles with respect to the shoes, when the toggle elements approach a position perpendicular to the axis of the mechanism, produces a greater change in the component of the blow which is directed perpendicular to the shell than corresponding movements of said ends of the toggle would produce when the toggles more closely approach a position parallel to the axis of the mechanism. This is of extreme importance in my construction in that, in the compressive stroke, I am enabled to obtain as great a spreading or wedging pressure exerted against the shoes and from the latter against the shells, as desired and, in release, any corresponding or reverse movements of the outer ends of the toggles produce a corresponding substantially instantaneous decrease in the spreading pressure so that the release is made certain and reliable.

I have herein shown and described what I now consider the preferred manner of carrying out the invention but the same is merely by way of illustration and not by way of limitation. All changes and modifications are contemplated that come within the scope of the claims appended hereto.

I claim:

1. In a friction shock absorbing mechanism, the combination with a friction shell, spring resistance, and friction shoes cooperable with the shell; of a pressure-applying member; and oppositely extending toggle elements between said member and shoes, said toggle elements crossing each other and each having bearing at one end on a shoe and at its other end on said member.

2. In a friction shock absorbing mechanism, the combination with a friction shell, spring resistance and friction shoes cooperable with the shell; of a pressure-applying member; and oppositely extending toggles interposed between said member and shoes, each of said toggles having bearing at one end on a shoe at one side of the longitudinal axis of the shell and at its other end on said member at the opposite side of said axis.

3. In a friction shock absorbing mechanism, the combination with a friction shell, spring resistance, and friction shoes cooperable with the shell; of a pressure-applying member; and oppositely extending toggles between said member and shoes, each toggle element being forked, the forks of one element extending between the forks of the other element, each element bearing at one end on a shoe and at its other end on said member.

In witness that I claim the foregoing I have hereunto subscribed my name this 24th day of May, 1920.

STACY B. HASELTINE.

Witness:
CARRIE GAILING.